(12) United States Patent
Taube et al.

(10) Patent No.: US 7,097,691 B2
(45) Date of Patent: Aug. 29, 2006

(54) METHOD FOR PRODUCING PIGMENT NANO-PARTICLES

(75) Inventors: Joel A. Taube, Donnellson, IA (US); Larry G. Putman, Tucson, AZ (US); Loyal M. Johnson, Jr., Tucson, AZ (US)

(73) Assignee: Cyprus Amax Minerals Company, Phoenix, AZ (US)

( * ) Notice: Subject to any disclaimer, the term of this patent is extended or adjusted under 35 U.S.C. 154(b) by 528 days.

(21) Appl. No.: 10/289,027

(22) Filed: Nov. 5, 2002

(65) Prior Publication Data

US 2003/0091488 A1 May 15, 2003

Related U.S. Application Data

(60) Provisional application No. 60/344,681, filed on Nov. 6, 2001.

(51) Int. Cl.
*B01D 7/02* (2006.01)

(52) U.S. Cl. ............................. 95/227; 95/229; 95/230

(58) Field of Classification Search .................. 95/149, 95/205, 227, 228, 229, 230; 96/322, 323, 96/329; 106/400, 401; 23/294 R; 261/DIG. 64
See application file for complete search history.

(56) References Cited

U.S. PATENT DOCUMENTS

| | | | |
|---|---|---|---|
| 3,938,969 A | 2/1976 | Sebenik et al. | |
| 4,140,695 A | 2/1979 | Takeuchi et al. | |
| 4,469,493 A * | 9/1984 | Tuovinen et al. | 95/201 |
| 4,654,229 A | 3/1987 | Morita et al. | |
| 5,143,527 A * | 9/1992 | Tian-Song | 96/351 |
| 5,186,872 A | 2/1993 | Nishiwaki et al. | |
| 5,318,623 A | 6/1994 | Azuma et al. | |
| 5,472,477 A * | 12/1995 | Konig | 75/343 |
| 5,665,277 A * | 9/1997 | Johnson et al. | 264/6 |
| 5,851,507 A * | 12/1998 | Pirzada et al. | 423/659 |
| 5,874,684 A * | 2/1999 | Parker et al. | 75/228 |
| 6,110,266 A | 8/2000 | Gonzalez-Blanco et al. | |
| 6,379,419 B1 * | 4/2002 | Celik et al. | 75/346 |
| 2002/0197203 A1 * | 12/2002 | Khan et al. | 423/606 |

* cited by examiner

Primary Examiner—Frank M. Lawrence
(74) Attorney, Agent, or Firm—Dahl & Osterloth, LLP

(57) ABSTRACT

Method for producing pigment nano-particles may include vaporizing a pigment precursor material; drawing the vaporized pigment precursor material into a precipitation conduit; contacting the vapor in the precipitation conduit with a collection fluid at a first location within the precipitation conduit, the contacting cooling the vapor and precipitating pigment nano-particles, the contacting occurring in the absence of a temperature change in the vapor at locations within the precipitation conduit that are upstream of the first location; and collecting the pigment nano-particles in a collection fluid.

19 Claims, 5 Drawing Sheets

METHOD FOR PRODUCING PIGMENT NANO-PARTICLES

CROSS-REFERENCE TO RELATED APPLICATION

This patent application claims priority to United States provisional patent application entitled "Pigment Size Reduction Apparatus And Method" of Joel A. Taube, Ser. No. 60/344,681, filed on Nov. 6, 2001, which is hereby incorporated herein by reference for all that it discloses.

FIELD OF INVENTION

This invention generally pertains to pigments, and more specifically, to apparatus and methods for producing pigment nano-particles.

BACKGROUND

Nano-particles (i.e., particles having average sizes less than about 1 micrometer) are known in the art and are of interest because size and structure dramatically change the properties of the material. For example, the extremely large surface area to weight ratio of nano-particles allows nano-particles to interact with their surroundings very quickly. Nano-particles of pigment material are of particular interest in the inkjet printer industry for use with high-quality printers having many small (e.g., nano-scale) delivery orifices.

Pigment nano-particles can be produced using a primarily mechanical process in which the pigment precursor material is ground in a mill (e.g., a ball mill) until particles of the desired size are produced. Such grinding processes, however, are energy intensive, require substantial amounts of time, and typically result in the production of a powder having undesirable, larger size particles. Such larger size particles must be separated from the pigment nano-particles before use. In addition, the abrasive materials used in such milling and grinding processes may also contaminate the pigment nano-particle material. Consequently, such grinding processes generally are not conducive to the large-scale production of a highly pure pigment nano-particle material.

Consequently, a need remains for a method and apparatus for producing pigment nano-particles that does not suffer from the shortcomings of the prior art methods and apparatus. Such a method and apparatus should be capable of producing large quantities of pigment nano-particle material at low cost. Ideally, such a method and apparatus should be less sensitive to certain process parameters than other systems, thereby allowing the method and apparatus to be more easily practiced on a large scale (i.e., commercial) basis. Additional advantages could be realized if the method and apparatus produced pigment nano-particles in a relatively narrow size range, with a minimum amount of larger sized particles and/or contaminant materials.

SUMMARY OF THE INVENTION

An embodiment of apparatus for producing pigment nano-particles may comprise a furnace having a vapor region, the furnace vaporizes a pigment precursor material. A precipitation conduit open to the vapor region of the furnace receives vapor from the pigment precursor material. A collection fluid port opening into the precipitation conduit delivers a collection fluid into contact with the vapor in the precipitation conduit, the vapor condensing to form the pigment nano-particles. A collection system in fluid connection with the precipitation conduit collects the pigment nano-particles in the collection fluid.

An embodiment of a method for producing pigment nano-particles may comprise vaporizing a pigment precursor material to form a vapor; drawing the vapor into a precipitation conduit, rapidly condensing the vapor in the precipitation conduit to form the pigment nano-particles, contacting the pigment nano-particles with a collection fluid in the precipitation conduit, and collecting the pigment nano-particles in the collection fluid.

BRIEF DESCRIPTION OF THE DRAWINGS

Illustrative and presently preferred embodiments of the invention are shown in the accompanying drawings in which.

DETAILED DESCRIPTION

Figure 1:
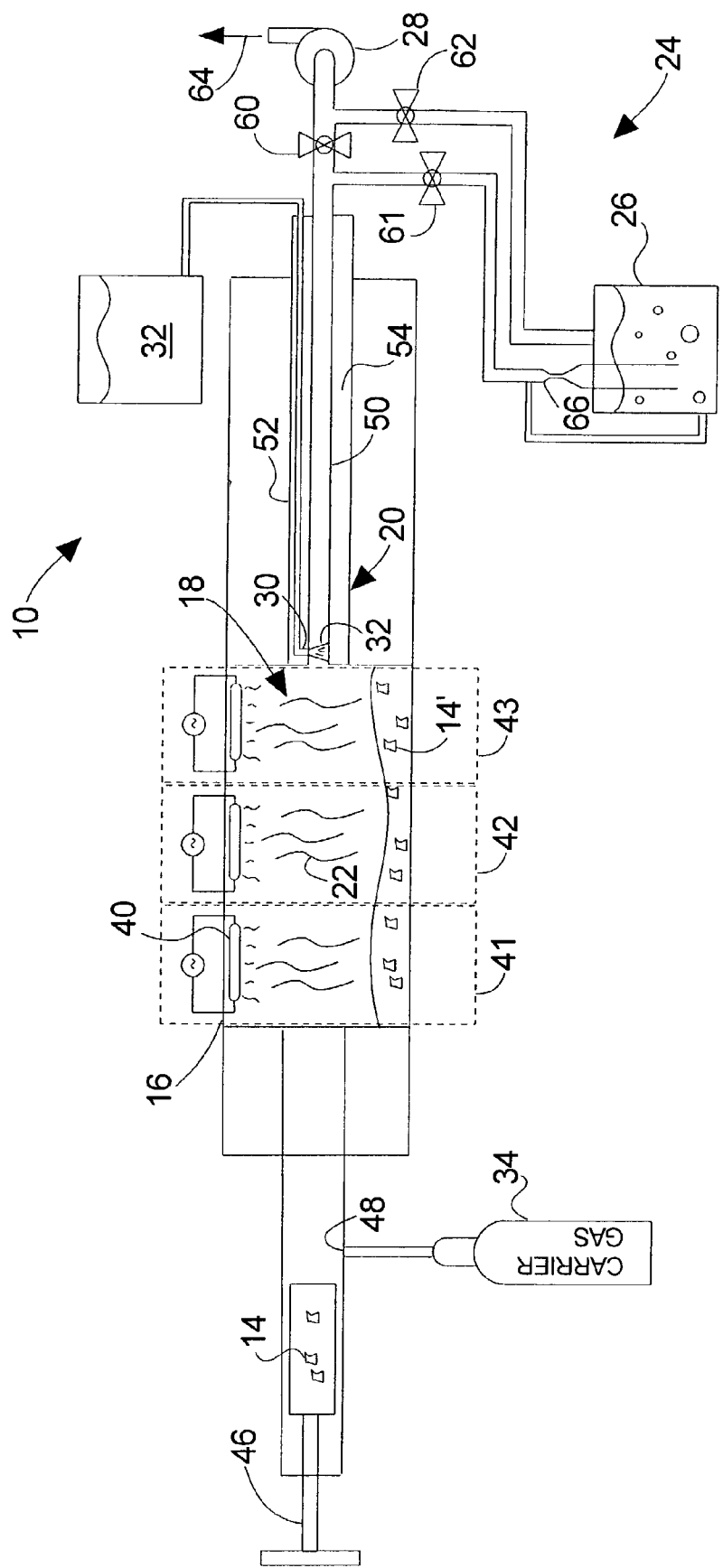
FIG. 1 is a schematic representation of the apparatus for producing pigment nano-particles according to one embodiment of the invention.

Apparatus 10 (FIG. 1) is shown and described herein as it may be used to produce pigment nano-particles 12 (FIG. 2) from a precursor material 14. Briefly, apparatus 10 for producing pigment nano-particles 12 may comprise a furnace 16 having a vapor region 18. Precursor material 14 is fed into the furnace 16 and vaporized. In one embodiment, the precursor material 14 may be sublimated (i.e., converted directly to a vapor or gas state from a solid state without passing through a liquid state), although the invention is not limited to such an embodiment. A precipitation conduit 20 open to vapor region 18 receives the vapor 22 from the vaporizing precursor material 14'. The vapor 22 condenses in the precipitation conduit 20 and forms the pigment nano-particles 12. Precipitation conduit 20 is connected to a collection system 24 which collects the pigment nano-particles 12.

Figure 2:
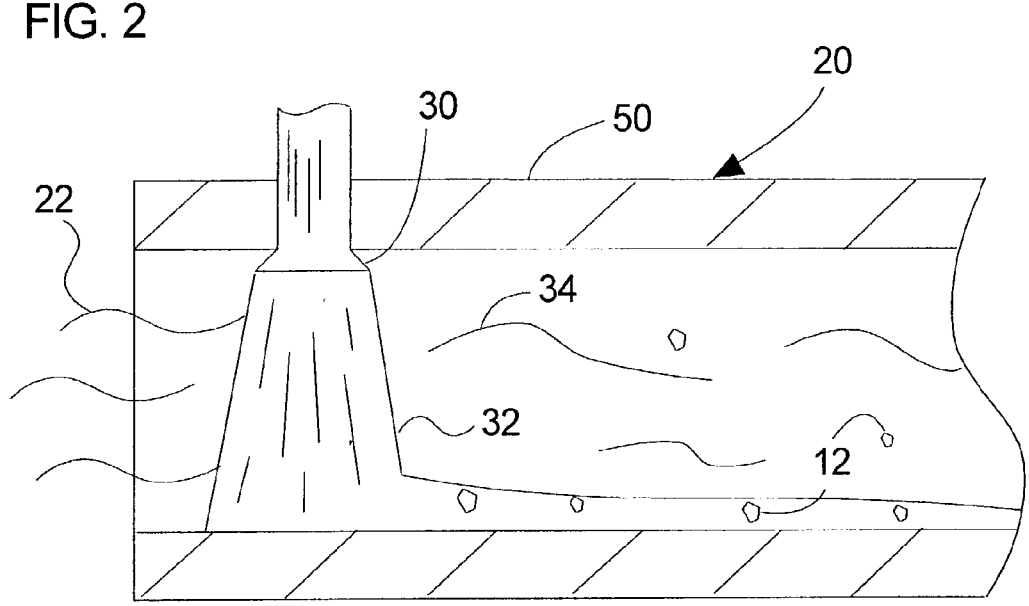
FIG. 2 is a cross-sectional view of a portion of the precipitation conduit in which the pigment nano-particles are formed.

Precipitation conduit 20 is shown in more detail in FIG. 2. A collection fluid port 30 opens into the precipitation conduit 20 and discharges collection fluid 32 into the precipitation conduit 20, preferably as a fine mist or fluid stream. As will be described in greater detail below, the collection fluid 32 may be used to rapidly cool the vapor 22, causing the vapor 22 to condense and form pigment nano-particle material 12 in the precipitation conduit 20. The pigment nano-particle material 12 is suspended in the collection fluid 32 and carried through the precipitation conduit 20 to the collection system 24.

Again with reference to FIG. 1, the collection system 24 may comprise a collection drum 26 and a pump 28 fluidically connected through the collection drum 26 to the precipitation conduit 20. The pump 28 draws or pumps the vapor 22 from the vapor region 18 into the precipitation conduit 20, where it condenses and forms the pigment nano-particle material 12. The pump 28 then draws or pumps the pigment nano-particle material 12 suspended in the collection fluid 32 into the collection drum 26.

Apparatus 10 may be operated as follows to produce pigment nano-particles 12. A suitable pigment precursor material 14 is fed into the furnace 16, where it is vaporized to produce vapor 22. The vapor 22 is generally formed in the vapor region 18 of the furnace 16. Depending on various design considerations, a carrier gas 34 may be introduced into vapor region 18 to enhance flow of the vapor 22 into the precipitation conduit.

Pump 28 may be activated to draw the vapor 22, and the carrier gas 34 where provided, from the vapor region 18 into the precipitation conduit 20. The vapor 22 condenses in the precipitation conduit 20 to form the pigment nano-particle material 12. For example, the vapor 22 flowing into precipitation conduit 20 may come into contact with collection fluid 32, which rapidly cools the vapor 22 (i.e., substantially adiabatically), precipitating the pigment nano-particle material 12. The precipitated pigment nano-particle material 12 is generally suspended within the collection fluid 32, although some of the pigment nano-particle material 12 may also be entrained in the carrier gas 34. The slurry containing the precipitated pigment nano-particle material 12 and carrier gas 34 are carried through the precipitation conduit 20 and ultimately collected by collection system 24.

Advantages of the present invention include, among others, the ability to produce large quantities of highly-pure pigment nano-particle material at low cost and on a shorter production schedule. The present invention is also relatively simple to construct, easy to operate, and is not overly sensitive to certain process parameters. Consequently, the present invention is ideally suited for use in large-scale (i.e., commercial) applications. Furthermore, the design of apparatus 10 allows ready removal of any pigment nano-particle material which may accumulate on the internal components of the system.

The pigment nano-particle material itself is a high-quality product that requires little or no additional processing before it may be used, making it particularly useful for use in, among other applications, high-quality inkjet printers. In addition, the purity of the pigment nano-particle material produced according to one embodiment of the invention gives it a "richer" color than what has been conventionally produced.

Having briefly described the method and apparatus according to one embodiment of the present invention, as well as some of the more significant features and advantages, the various embodiments of the method and apparatus for producing pigment nano-particles of the present invention will now be described in detail.

Referring to FIG. 1, one embodiment of apparatus 10 is shown and described herein as it may be used to produce pigment nano-particles 12 from a precursor material 14. Apparatus 10 may comprise a furnace 16 having a vapor region 18. The furnace 16 is suitable for receiving a supply of the precursor material 14 and vaporizing it.

In the embodiment shown and described herein, the furnace 16 comprises a rotary tube furnace having one or more electric heating elements 40. Preferably, the furnace 16 has three heating zones 41, 42, 43, although other embodiments are also contemplated as being within the scope of the invention. Electric heating elements 40 are used to elevate and maintain the temperature inside each of the heating zones 41–43 at level(s) sufficient to vaporize the pigment precursor material 14.

It should be noted that the present invention is not limited to use with a rotary tube furnace. Nor does the invention require the use of electric heating elements. Any of a wide range of other furnaces that are now known in the art or that may be developed in the future that are suitable for vaporizing the pigment precursor material 14 may be used according to the teachings of the invention. Examples of other types of furnaces 16 that could be utilized with the present invention include, but are not limited to, muffle furnaces, induction furnaces, vacuum furnaces, and arc furnaces.

The pigment precursor material 14 may be delivered to the furnace 16 in any suitable manner. In one embodiment, the pigment precursor material 14 is fed into the furnace 16 in batch mode using a shot feeder 46 (FIG. 1). That is, pigment precursor material 14 is loaded into the shot feeder 46 outside of the furnace 16, then delivered into the furnace 16, where the pigment precursor material 14 is emptied from the shot feeder 46. However, delivery of the pigment precursor material 14 may be accomplished using other suitable delivery systems. In addition, the invention is not limited to a batch mode product delivery schedule. In other embodiments, the pigment precursor material 14 may be continuously fed into the furnace 16, for example, using a screw-type conveyor system (not shown). Yet other delivery systems may also be used according to the teachings of the invention, some of which will be discussed below with respect to alternative embodiments.

As discussed above, the carrier gas 34 may also be delivered into the vapor region 18 of furnace 16. The carrier gas 34 is preferably an inert gas, such as nitrogen. However, other gases may be used based on the properties of the precursor material 14 and the desired properties of the pigment nano-particles 12. The use of carrier gas 34 promotes an even flow of the vapor 22 from vapor region 18 into the precipitation conduit 20, thereby enhancing production of the pigment nano-particles 12.

Precipitation conduit 20 is open to the vapor region 18 of the furnace 16. The precipitation conduit 20 may comprise a generally elongate, pipe-like inner member 50, and may be supported along at least a portion of its length by a generally elongate, pipe-like outer member 52, as best seen in FIG. 1. Pipe-like inner member 50 fluidically connects vapor region 18 of the furnace 16 to the collection system 24.

In the embodiment shown and described herein, outer member 52 is generally concentrically aligned with inner member 50 and is separated a spaced distance therefrom so that an insulating space or annulus 54 is defined between the inner and outer members 50 and 52. The insulating annulus 54 may be maintained under a vacuum to enhance its insulating properties. The insulating annulus 54 is advantageous in that it helps to maintain the inner member 50 at cooler temperatures, thereby discouraging the re-vaporization of the precipitated pigment nano-particle material 12 flowing through the precipitation conduit 20.

It is noted that the inner and outer members 50, 52 of precipitation conduit 20 may be fabricated from any of a wide variety of materials (e.g., hightemperature alloys and stainless steels) suitable for the intended application. In addition, the inner and outer members 50, 52 may have dimensions that are commensurate with the size (i.e., desired production capacity) of the apparatus 10 for the desired production of pigment nano-particles 12. In the embodiment shown and described herein, the inner member 50 has an outer diameter of 2.375 inches (6.033 cm) and an inside diameter of about 2.067 inches (5.250 cm) and a wall thickness of about 0.154 inches (0.391 cm). The outer member 52 may have an outer diameter of about 4.5 inches (11.43 cm) and an inside diameter of about 4.26 inches (10.82 cm) and a wall thickness of about 0.12 inches (0.305 cm). Accordingly, the insulating space or annulus 54 will have a thickness of about 0.943 inches (2.395 cm).

As was briefly described above, the inner member 50 of precipitation conduit 20 is provided with a collection fluid port 30. In the embodiment shown and described herein, the collection fluid port 30 is fluidically connected to a supply of collection fluid 32. The collection fluid port 30 is suitable for discharging the collection fluid 32 into the inner member 50 of precipitation conduit 20, as shown in more detail in FIG. 2.

In one embodiment, collection fluid port 30 comprises one or more nozzles that are configured to discharge a spray or a "curtain" of collection fluid into inner member 50 of the precipitation conduit 20. Preferably the collection fluid 32 is discharged as a fine mist. In addition, the collection fluid 32 preferably sprays through a cross-section of the inner member 50 of precipitation conduit 20 so as to come into contact with most, if not all of the vapor 18 entering the precipitation conduit 20.

The collection fluid 32 is discharged into the precipitation conduit 20 so that the collection fluid 32 contacts the vapor 22, causing it to cool. As the vapor 22 cools, the pigment nano-particles 12 precipitate and become suspended in the collection fluid 32, as illustrated in FIG. 2. Some of the precipitated pigment nano-particles 12 may also become entrained in the carrier gas 34, also as illustrated in FIG. 2.

Collection fluid 32 may comprise any of a wide range of fluids suitable for effecting the rapid (i.e., substantially adiabatic) cooling of the vapor 22. In one embodiment, collection fluid 32 is water. However, the collection fluid 32 may also comprise a mixture of fluids, organic fluids (e.g., ethylene-glycol, kerosene), a base, or other fluids suitable for mixing with the pigment nano-particles 12. The selection of collection fluid 32 may, at least to some extent, be based on the desired characteristics of the pigment nano-particles 12. Design considerations may also include the desired medium in which the product is collected, as may be specified by the end-user of the pigment nano-particles 12, among others.

The location of the collection fluid port 30 within the precipitation conduit 20 may influence characteristics (e.g., size) of the pigment nano-particles 12 produced by the apparatus 10 according to the present invention. For example, moving the location of the collection fluid port 30 closer to the vapor region 18 of furnace 16 generally results in the production of larger pigment nano-particles 12. Conversely, moving the location of the collection fluid port 30 away from the vapor region 18 generally results in the production of smaller pigment nano-particles 12.

Other design factors can also affect characteristics of the pigment nano-particles 12. For example, increasing the flow rate of the collection fluid generally results in the production of larger pigment nano-particles 12. Alternatively, extending the precipitation conduit 20 at least partially within vapor region 18 of the furnace 16 and positioning the collection fluid port 30 therein may also affect the production of pigment nano-particles 12. However, we have found that it is generally preferable to position the precipitation conduit 20 and the collection fluid port 30 external to the furnace 16 in the manner shown and described herein.

The temperature of the precipitation conduit may also affect characteristics of the pigment nano-particle material 12 that is produced. It is generally preferred, but not required, to position a temperature sensor, such as a thermocouple (not shown) within the interior region of the precipitation conduit 20 at a location downstream from the collection fluid port 30. The output signal from the thermocouple may be monitored to maintain the temperature of the suspended pigment nano-particle material 12 within a desired temperature range that is appropriate for the particular pigment nano-particles 12 being produced.

Since the sizes of the pigment nano-particles produced by apparatus 10 of the present invention are related to several structural and operational parameters of the invention, as described herein, the present invention should not be regarded as limited to any particular parameters or range of parameters for any given structural or operational configuration.

Pigment nano-particle material 12 exiting the precipitation conduit 20 (e.g., suspended in the collection fluid 32 and/or entrained in the carrier gas 34) is conveyed to a collection system 24. The collection system 24 is best seen in FIG. 1 and may comprise a pump 28 and collection drum 26. The pump 28 draws the vapor 22 from the furnace 16 into the precipitation conduit 20, where the pigment nano-particles 12 are formed, as previously described. The pump 28 then draws the carrier gas 34 and the collection fluid 32 with the suspended pigment nano-particles 12 into the collection drum 26. The carrier gas 34 is scrubbed and discharged into the surrounding atmosphere and the pigment nano-particle material 12 is collected in the collection drum 26.

Pump 28 may comprise any of a wide range of gas-state pumping devices that are well-known in the art and readily commercially available. By way of example, the pump 28 may comprise a Leybold vacuum pump/centrifugal blower having a capacity of about 2407 liters per minute (85 cubic feet per minute), commercially available from Leybold Vacuum USA, Inc. (Export, Pa. 15632). Of course, the pump 28 may have a larger or smaller capacity depending on the intended production capacity of apparatus 10. In another embodiment, the pump 28 may be provided with a variable capacity to allow the user to vary the flow rate of the pump 28 to more easily effect certain changes in the sizes and/or production quantity of the pigment nano-particle material 12.

Optional purge valves 60, 61, 62 may be provided for use in conjunction with pump 28 prior to operation to evacuate apparatus 10. According to the embodiment shown in FIG. 1, purge valves 61, 62 may be closed and purge valve 60 opened and pump 28 actuated to evacuate the furnace 16 and precipitation conduit 20. Purge valve 60 may then be closed and purge valves 61, 62 opened so that the collection fluid 32 and carrier gas 34 are diverted through the collection drum 26 during operation.

The collection drum 26 serves to retain the pigment nano-particle material 12 and to scrub the carrier gas 34. During operation, pump 28 draws both the collection fluid 32 and the carrier gas 34 from the precipitation conduit 20 and empties the collection fluid 32 and carrier gas 34 into the collection drum 26. Discharge is preferably below the surface of a liquid provided in the collection drum 26. The liquid may be any of a wide range of liquids, such as a mixture of water and ethylene-glycol. The properties of the liquid may depend on various design considerations, such as the desired characteristics of the product as specified by the end-user of the pigment nano-particles 12, and its properties when mixed with the collection fluid 32, to name only a few.

In any event, the carrier gas 34 is bubbled through the liquid in the collection drum 26 to scrub any pigment nano-particle material 12 from the carrier gas 34. Carrier gas 34 may then be discharged to the atmosphere, as illustrated by arrow 64 in FIG. 1. Collection fluid 32 and the pigment nano-particle material 12 is collected in the collection drum 26, which may be diverted or drained occasionally to retrieve the pigment nano-particle material 12.

Collection system 24 may also comprise a venturi scrubber 66. Use of a venturi scrubber 66 may increase the removal efficiency of the pigment nano-particles 12 entrained in the carrier gas 34. Operation and design of venturi scrubbers 66 is well-known in the art for removing particulates from gas streams. Briefly, the converging walls of the venturi scrubber 66 create a pressure differential through the throat of the venturi scrubber 66. This, combined with a large surface area for contacting the gas stream (e.g., the carrier gas) with the liquid stream (e.g., the collection fluid) aids in the transfer of particulates from the gas stream to the liquid stream passing therethrough. The higher the pressure drop, the greater the removal efficiency.

According to one embodiment, the venturi scrubber 66 is provided upstream from the collection drum 26. The collection fluid 32 and carrier gas 34 flow from the precipitation conduit 20 through the venturi scrubber 66 before being discharged into the collection drum 26. Liquid from the collection drum 26 can be recirculated upstream of the venturi scrubber 66 to dilute the collection fluid 32 and increase its ability to entrain more of the pigment nano-particles 12 from the carrier gas 34.

Other systems could also be used to capture the pigment nano-particle material 12 suspended in the collection fluid 32 and/or entrained in the carrier gas 34. For example, collection system 24 may be provided with a filter (not shown) suitable for removing small particles from the carrier gas 32. The use and selection of such a filter will depend on design considerations, and may also be governed by certain regulatory requirements governing discharge of process gases to the atmosphere. Since filters for capturing such nano-sized particles are well-known in the art and could be easily provided by persons having ordinary skill in the art after having become familiar with the teachings of the present invention, filters that could be used with the present invention will not be described in further detail herein.

Yet other product collection devices and processes can be readily provided, as would be obvious to persons having ordinary skill in the art after having become familiar with the teachings of the present invention. Consequently, the present invention should not be regarded as limited to the particular product collection system 24 shown and described herein.

Apparatus 10 may be operated in accordance with the following embodiment of a method for producing pigment nano-particles 12. As a first step, the apparatus 10 may be evacuated. For example, purge valves 61, 62 may be closed and purge valve 60 opened to by-pass the collection drum 26, and the pump 28 operated to draw carrier gas 34 through the furnace 16 and precipitation conduit 20. The purge valves 61, 62 may then be opened and purge valve 60 closed to divert flow through the collection drum 26 during operation.

The pigment precursor material 14 is then fed into the furnace 16 (e.g., in a continuous or batch manner), as discussed above. A pigment precursor material 14 suitable for use with the present invention is copper phthalocyanine crystals, and may be used to produce pigment nano-particles of copper phthalocyanine.

Of course other pigment precursor materials are available and could also be used in conjunction with the present invention, as would be obvious to persons having ordinary skill in the art after having become familiar with the teachings of the present invention. For example, pigment nano-particles may be made from proprietary pigment precursor materials such as PY14 (yellow), PG7 (green), and 57:1 (red), which are commercially available from Heucotech, Ltd. (Fairless Hills, Pa. 19030). These are merely exemplary of other pigment precursor materials that may be used according to the teachings of the invention and are not intended to limit the scope of the invention.

Regardless of the particular pigment precursor material 14 that is used, the furnace 16 heats the pigment precursor material 14 to a temperature in the range of about 540 to 700° C. (with optimum results being obtained within a temperature range of about 680° C.), which is sufficient to vaporize, and in one embodiment sublimate, the pigment precursor material 14 and form a vapor 22 in vapor region 18 of the furnace 16.

The vapor 22 may be combined with a carrier gas 34, such as nitrogen or any other desired atmosphere, to assist in the flow of the vapor 22 into the precipitation conduit 20. The vapor 22 (along with the carrier gas 34) is drawn into precipitation conduit 20, for example, under the influence of pump 28.

Upon entering the precipitation conduit 20, vapor 22 is brought into contact with collection fluid 32 being discharged from the collection fluid port 30. The collection fluid 32 is considerably cooler (e.g., about 15° C. to 50° C.) than the vapor 22 and causes rapid (i.e., substantially adiabatic) cooling of the vapor 22 and the formation, or precipitation of the pigment nano-particle material 12. The resulting mixture of precipitate (in the form of the pigment nano-particles 12) and collection fluid 32, along with the carrier gas 34, continues to be carried through the precipitation conduit 20, whereupon it is discharged into the collection system 24.

The mixture of pigment nano-particles 12 and collection fluid 32, along with the carrier gas 34, which is discharged into the collection system 24 ultimately reaches the collection drum 26. The collection fluid 32 and carrier gas 34 are discharged below the surface of the liquid in the collection drum 26 so that pigment nano-particle material 12 which may be entrained in the carrier gas 34 can be scrubbed as it bubbles through the liquid. Discharging the collection fluid 32 beneath the surface of the liquid also reduces the re-entrainment of the pigment nano-particle material 12 in the scrubbed carrier gas 34.

From time to time, contents of the collection drum 26 may be diverted or otherwise emptied to retrieve the slurry containing the pigment nano-particles 12. The carrier gas 34 may be discharged into the surrounding atmosphere.

Figure 3A:
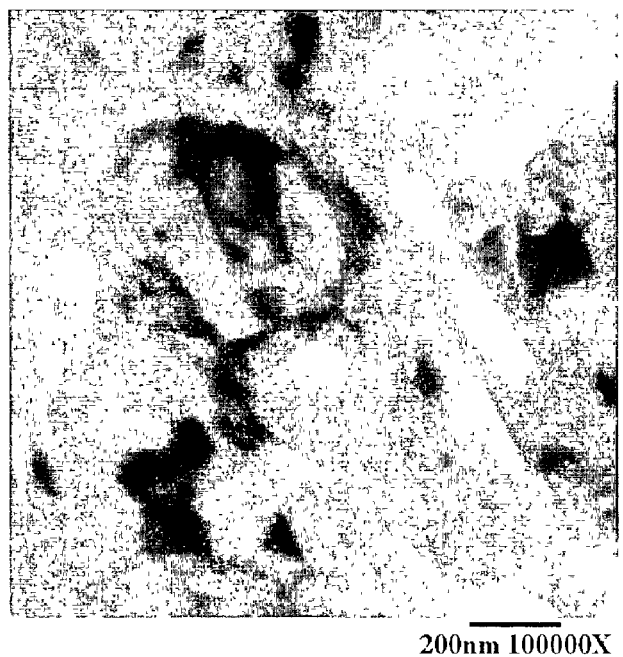
FIGS. 3(*a*) and 3(*b*) are scanning electron microscope images of pigment nano-particle material produced according to the teachings of the present invention.
Figure 3B:
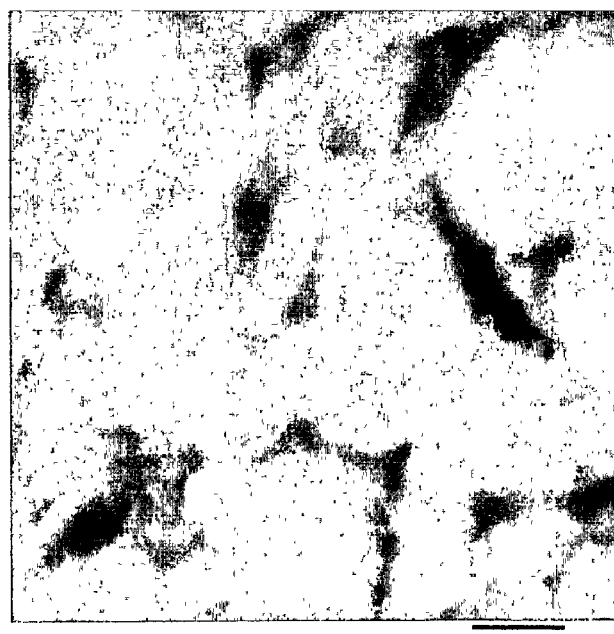

FIGS. 3(a) and 3(b) are images of pigment nano-particle material 12 produced by a scanning electron microscope in a process that is commonly referred to as scanning electron microscopy (SEM). As is readily seen in FIGS. 3(a) and 3(b), individual particle of the pigment nano-particle material 12 range from generally cylindrical to generally spherically-shaped configuration. Preferably, most if not all of the pigment nano-particle material is generally spherical in shape. Faster cooling of vapor 18 as it enters the precipitation conduit 20 tends to result in the production of more spherical-shaped pigment nano-particles 12.

The size of the pigment nano-particle material 12 can be expressed in terms of the mean diameter of the particles. The particle size may be determined using scanning electron microscopy, transmission electron microscopy, or a suitable particle size analyzer, such as the laser diffraction particle size analyzer (model no. LA910) commercially available from Horiba Laboratory Products (Irvine, Calif. 92614). The preferred pigment nano-particle material 12 has a diameter of less than about 200 nm, and more preferably a diameter of less than about 100 nm.

Figure 5:
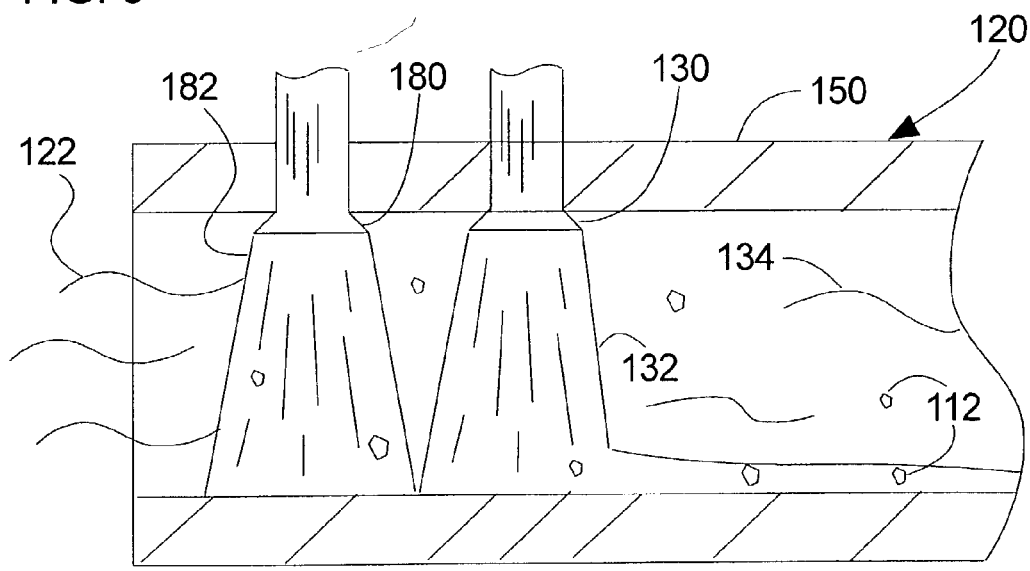
FIG. 5 is a cross-sectional view of a portion of the precipitation conduit in which the pigment nano-particles are formed according to the embodiment of the apparatus shown in FIG. 4.
Figure 4:
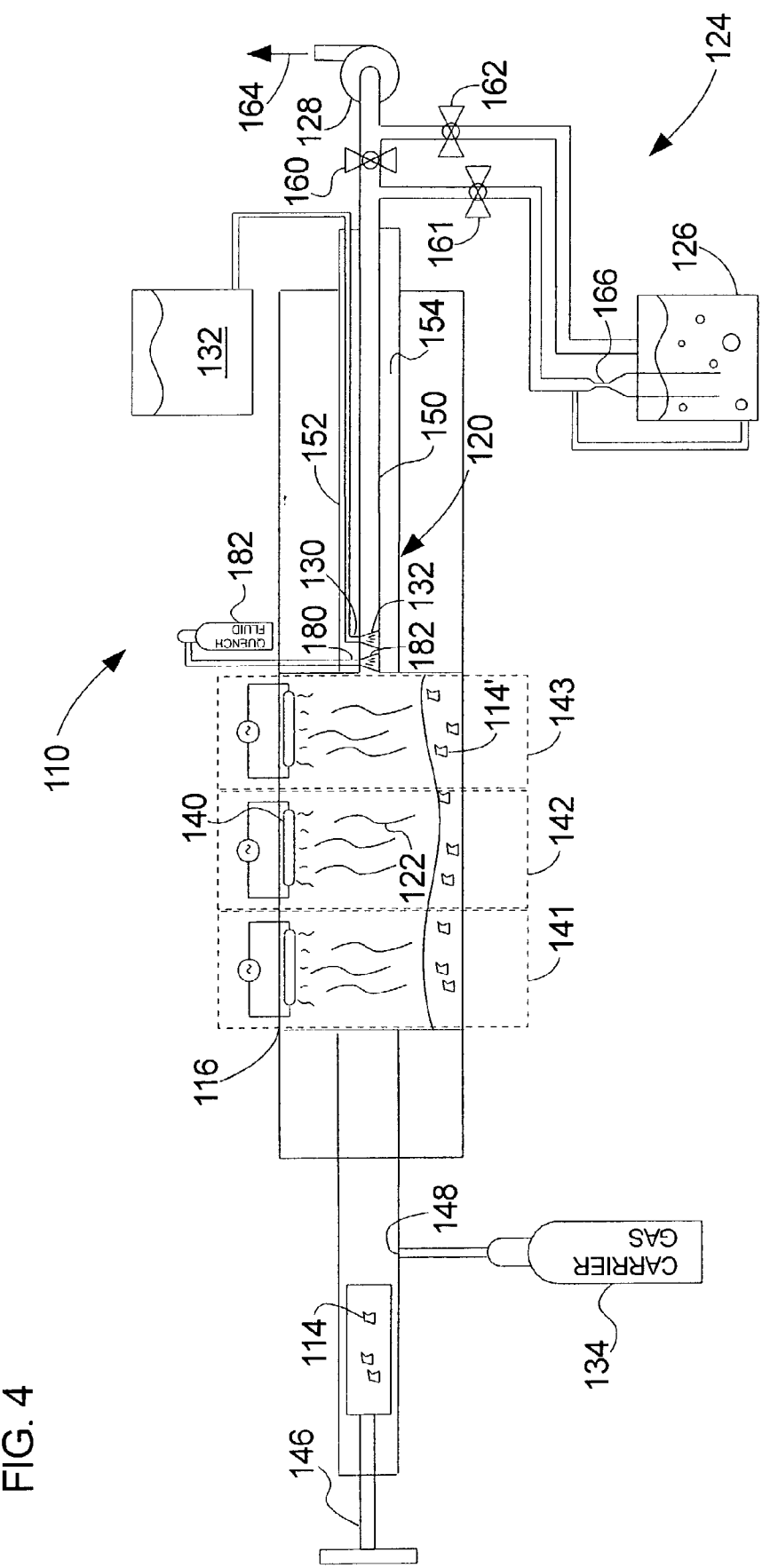
FIG. 4 is a schematic representation of another embodiment of the apparatus for producing pigment nano-particles.

An alternative embodiment of apparatus 110 is shown and described with respect to FIG. 4 and FIG. 5. It is noted that one-hundred series reference numbers are used to refer to the like elements of this embodiment.

According to this embodiment of apparatus 110, inner member 150 of precipitation conduit 120 is provided with a quench fluid port 180, as shown in more detail in FIG. 5. The quench fluid port 180 is fluidically connected to a supply of quench fluid 182 (FIG. 4) and discharges the quench fluid 182 into the inner member 150 of precipitation conduit 120. Quench fluid 182 may comprise a fluid suitable for effecting the rapid (i.e., substantially adiabatic) cooling of the vapor 122, causing the vapor 122 to condense and form pigment nano-particle precipitate 112.

In the embodiment shown and described herein, the supply of quench fluid 182 may comprise liquid nitrogen. An optional accumulator (not shown) may be provided in order to provide optimal quenching performance between the supply of quench fluid 182 and the quench fluid port 180. The accumulator helps to ensure that the quench fluid 182 is discharged as a liquid, as opposed to a liquid/gas mixture. Alternatively, a liquid/gas mixture can be used if increased flow-rates are desired and the end temperature is maintained within the desired range.

Although any suitable quench fluid 182 may be used, it is generally preferable that the quench fluid 182 be a cryogenic fluid. As used herein, the term "cryogenic fluid" refers to liquids that boil at temperatures of less than about 110 K (−163.15° C.) at atmospheric pressure. Cryogenic fluids include, but are not limited to, hydrogen, helium, nitrogen, oxygen, argon air, and methane.

Also according to this embodiment, apparatus 110 preferably comprises collection fluid port 130, which may be arranged downstream from quench fluid port 180 to deliver collection fluid 132 into the precipitation conduit 120. Again, collection fluid 132 may be any suitable fluid or mixture thereof, including but not limited to water and ethylene-glycol, as discussed above.

The collection fluid 132 is discharged into the precipitation conduit 120 in such a manner so that the pigment nano-particles 112 formed by the rapid cooling of vapor 122 by quench fluid 182 become suspended in the collection fluid 132 and can be readily collected by the collection system 124, as described above.

Figure 6:
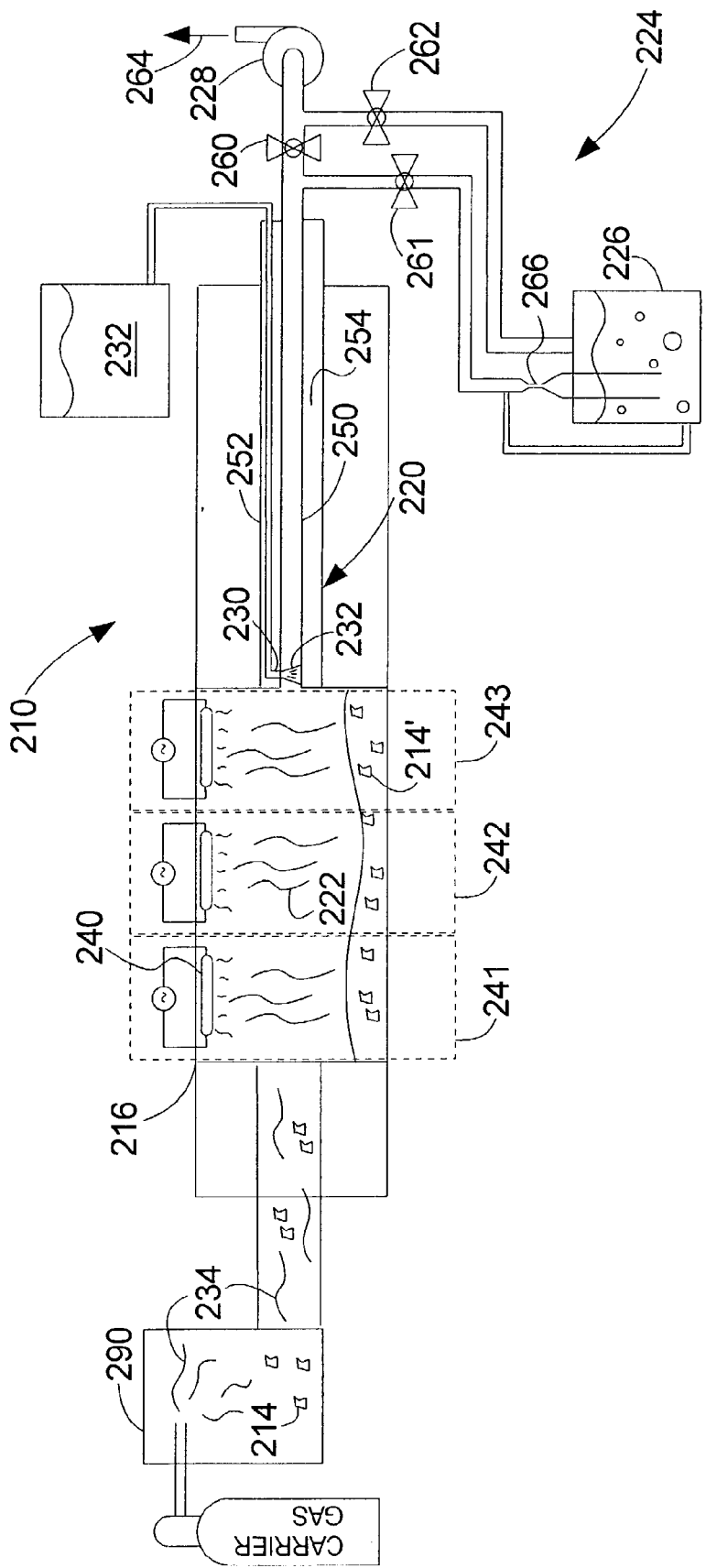
FIG. 6 is a schematic representation of another embodiment of the apparatus for producing pigment nano-particles.

Another alternative embodiment of the apparatus 210 is shown in FIG. 6. It is noted that two-hundred series reference numbers are used to refer to the like elements of this embodiment.

According to this embodiment of apparatus 210, pigment precursor material 214 is delivered to the furnace 216 on a continuous basis. The pigment precursor material 214 is stored in a storage chamber 290, and the carrier gas 234 is introduced into the storage chamber 290. The pigment precursor material 214 becomes entrained in the carrier gas 234 in storage chamber 290, and when the pump 228 is operated, it draws the carrier gas 234 and entrained pigment precursor material 214 into the furnace 216.

Of course it is understood that other embodiments and product-delivery schedules may also be used. The embodiment shown in FIG. 6 is provided merely as illustrative of another embodiment that is suitable for use according to the teachings of the present invention, and is not intended to limit the scope of the invention.

EXAMPLE

In this example, pigment precursor material comprised 15.3 copper phthalocyanine crystals having a mean size of about 25.9 microns. The pigment precursor material is readily commercially available from Sun Chemical Corporation, Fort Lee, N.J. 07024. The precursor material was provided to an electrically heated furnace of the type described above having a capacity to sublimate or vaporize approximately 5 grams/minute of pigment precursor material.

A precipitation conduit having the configuration and dimensions of the precipitation conduit described above was mounted adjacent the vapor region of the furnace. The precipitation conduit was fluidically connected to a collection system. The precursor material was fed into the furnace in batch mode using a shot feeder. In the furnace, the precursor material was heated to a temperature of about 680° C. which was sufficient to sublime the precursor material.

Nitrogen carrier gas was provided at about 2–5 liters per minute. A supply of collection fluid (i.e., water and ethylene-glycol mixture) was discharged in accordance with the description provided herein. The pump associated with the product collection apparatus, such as the type described above, was turned on to produce a vacuum of about 10–50 torr.

The apparatus started to produce the pigment nano-particle material, which was thereafter captured by the collection system. The flow-rate of the collection fluid was such that the temperature of the slurry containing the pigment nano-particle material 12 as measured by the thermocouple positioned within the precipitation conduit was maintained in the range of about 25° C.±5° C. The apparatus was operated in this manner for a time period of about 16 hours, which resulted in the production of about five gallons of pigment nano-particle material suspended in collection fluid having about 10 wt % pigment nano-particles, 15 wt % ethylene-glycol, and 75 wt % water. The pigment nano-particle material had a mean diameter of less than about 100 nm as determined using a laser diffraction analyzer, such as the type described above.

It is readily apparent that the apparatus and process discussed herein may be used to produce large quantities of highly-pure pigment nano-particle material. Consequently, the claimed invention represents an important development in nano-particle technology in general and to pigment nano-particle technology in particular. Having herein set forth preferred embodiments of the present invention, it is anticipated that suitable modifications can be made thereto which will nonetheless remain within the scope of the present invention. Therefore, it is intended that the appended claims be construed to include alternative embodiments of the invention except insofar as limited by the prior art.

What is claimed is:

1. A method for producing pigment nano-particles, comprising:

vaporizing a pigment precursor material to form a vapor;
drawing said vapor into a precipitation conduit;
contacting said vapor in the precipitation conduit with a collection fluid, said contacting occurring at a first location within the precipitation conduit, said contacting cooling said vapor and precipitating pigment nano-particles, said contacting occurring in the absence of a temperature change in said vapor at locations within the precipitation conduit that are upstream of the first location; and collecting the pigment nano-particles in the collection fluid.

2. The method of claim 1, wherein contacting said vapor further comprises suspending at least a portion of the precipitated pigment nano-particles in the collection fluid.

3. The method of claim 1, wherein contacting said vapor occurs at about an inlet end of the precipitation conduit.

4. The method of claim 1, further comprising varying a mean diameter of the precipitated pigment nano-particles by moving the first location relative to an inlet end of the precipitation conduit.

5. The method of claim 4, further comprising increasing the mean diameter of the precipitated pigment nano-particles by moving said first location toward the inlet end of the precipitation conduit.

6. The method of claim 4, further comprising decreasing the mean diameter of the precipitated pigment nano-particles by moving said first location away from the inlet end of the precipitation conduit.

7. The method of claim 1, further comprising combining said vapor with a carrier gas before drawing the vapor into the precipitation conduit.

8. The method of claim 7, wherein contacting further comprises entraining at least a portion of the precipitated pigment nano-particles in the carrier gas.

9. The method of claim 1, further comprising maintaining a temperature of the precipitation conduit at a location downstream of the first location within a desired tolerance.

10. The method of claim 9, wherein the desired tolerance is ±5° C.

11. A method for producing pigment nano-particles, comprising:

vaporizing copper phthalocyanine to form a vapor;
drawing said vapor into a precipitation conduit;
contacting said vapor in the precipitation conduit with a collection fluid, said contacting occurring at a first location within the precipitation conduit, said contacting cooling said vapor and precipitating pigment nano-particles of copper phthalocyanine, said contacting occurring in the absence of a temperature change in said vapor at locations within the precipitation conduit that are upstream of the first location; and
collecting the pigment nano-particles of copper phthalocyanine in the collection fluid.

12. The method of claim 11, wherein said contacting said vapor with a collection fluid comprises contacting said vapor with a mixture of water and ethylene-glycol.

13. The method of claim 11, wherein said vaporizing is conducted at a temperature of about 680° C.

14. The method of claim 11, further comprising maintaining a temperature of the precipitation conduit at a location downstream of the first location at about 25° C.

15. The method of claim 11, further comprising combining said vapor with a nitrogen before drawing said vapor into the precipitation conduit.

16. A method for producing pigment nano-particles, comprising:

vaporizing a pigment precursor material to form a vapor;
drawing said vapor into a precipitation conduit;
directly contacting said vapor in the precipitation conduit with a quench fluid to initiate formation of pigment nano-particles;
contacting residual amounts of said vapor and the pigment nano-particles in the precipitation conduit with a collection fluid in a liquid state, said contacting cooling the residual amounts of said vapor and producing additional quantities of pigment nano-particles; and
collecting the pigment nano-particles in the collection fluid.

17. The method of claim 1, wherein collecting the pigment nano-particles in the collection fluid comprises removing the pigment nano-particles from a carrier gas.

18. The method of claim 17, wherein the nano-particles are removed from the carrier gas at least partially by bubbling the carrier gas through a collection drum.

19. The method of claim 17, wherein the pigment nano-particles are removed from the carrier gas at least partially by directing the carrier gas through a venturi scrubber.

* * * * *